United States Patent [19]

Deming et al.

[11] 4,357,564

[45] Nov. 2, 1982

[54] CLOSURE OPERATOR CONTROL

[75] Inventors: Andrew F. Deming, Alliance, Ohio; Ronald C. Todd, Gibsonia, Pa.

[73] Assignee: The Alliance Manufacturing Company, Alliance, Ohio

[21] Appl. No.: 27,998

[22] Filed: Apr. 9, 1979

[51] Int. Cl.[3] .......................... H02P 1/22; H02P 3/20

[52] U.S. Cl. ...................................... 318/280; 318/16; 318/282; 318/466; 318/256

[58] Field of Search .............................. 49/26, 28-32; 318/280, 282, 284, 285, 286, 288, 289, 256, 16, 467, 469, 681, 300, 466; 307/141, 141.4, 139, 116

[56] References Cited

U.S. PATENT DOCUMENTS

| | | | |
|---|---|---|---|
| 3,539,894 | 11/1970 | Feldman | 318/469 X |
| 4,045,715 | 8/1977 | Umpleby et al. | 318/282 |
| 4,142,137 | 2/1979 | Umpleby et al. | 318/256 X |
| 4,146,826 | 3/1979 | Wojslawowicz | 318/300 X |

*Primary Examiner*—Ulysses Weldon

*Attorney, Agent, or Firm*—Pearne, Gordon, Sessions, McCoy & Granger

[57] ABSTRACT

A motorized operator is used for control of a closure, e.g., a garage door operator. Where the garage door is an upward opening door, there are four conditions for operation of the control system, namely stop-down, run-up, stop-up, and run-down. The present operator is one wherein safety conditions prevail, in that the run-down condition may not be established by a simple single closing of a switch because this might be effected carelessly or accidentally. The run-down condition is only established by plural closings of a switch. Gate means are provided within the control system so that the plural actuations of the switch will establish the run-down condition and this may be established only when the door is in the stop-up condition. The plural actuations of the switch must take place within a predetermined time period in order to establish the run-down condition.

19 Claims, 5 Drawing Figures

CLOSURE OPERATOR CONTROL

BACKGROUND OF THE INVENTION

Closure operators have been utilized in many ways, e.g., power operators to open and close windows in automobiles, as well as power operators to open and close doors in structures, for example residential garage doors. In connection with both types of closures, there is the possibility of damage or injury to property or persons if the closure is made to close upon a sill and there is some object or person obstructing this closing movement. In an automobile, for example, a small child might have his head out the window opening and the window, upon closing, could close upon that child's neck. In a garage door operator, frequently the door is actuated by a remotely controlled radio transmitter, as well as a doorbell push button type of switch, usually within the garage. Trees or bushes along the driveway may obscure the vision of a driver approaching or retreating from the garage door and, thus, if the door operator is actuated carelessly, damage or injury may result. Also, in many cases the garage door push button switch on the inside of the garage is at an appropriate height whereat a rake or long-handled tool might accidentally be leaned against this switch to cause it to be closed momentarily. This could start the garage door on its downward travel.

A garage door is a heavy object, often weighing several hundred pounds. Such garage doors are supposed to be counterbalanced by weights, or usually by springs, but painting or adverse weather conditions can affect the actual weight of the door. Also, many doors have adjustable clutches of some type to adjust the torque or force acting on the door to open or close it. In some cases, there is only one clutch and if this clutch must be tightened considerably in order to drive a poorly counterbalanced door upwardly, then when it is driving it downwardly, one would have the extra non-counterbalanced weight of the door plus the unusually strong clutch force. These are examples of dangerous conditions which may be encountered in the closing of a garage door.

The problem to be solved, therefore, is how to establish a closure operator control which is safer in operation, especially when being actuated toward a closed condition which might cause damage or injury.

SUMMARY OF THE INVENTION

This problem is solved by a control circuit for a door operator motor operable from a voltage source to open and close a door as controlled by signals from manual switch means, said control circuit comprising in combination, a power circuit connected between said voltage source and said motor to establish energization of said motor, first control means connecting said manual switch means to said power circuit to control said motor starting in an opening direction of the door and including a first type of contact closure of said manual switch means, second control means connecting said manual switch means connected to said power circuit to control said motor starting in a closing direction of the door, and said second control means requiring a second different type of contact closure of said manual switch means.

The problem is further solved by a control circuit, comprising, in combination, an electric motor connectable to drive a load in first and second opposite directions toward first and second limit positions, respectively, electrical terminals connectable to an electrical power source, a power circuit connected to said motor and to said terminals for energization of said motor to drive said load in said first and second directions, a manual switch, first control means operable with the load at rest in said second position and interconnecting said switch and said power circuit and responsive to a first type of actuation conditions of said switch to establish said motor operational to move the load in said first direction, and said second control means operable with the load at rest in said first position and interconnecting said switch and said power circuit and responsive to a second type of actuation conditions of said switch to establish said motor operational to move the load in said second direction.

The problem is further solved by a control system for connection to a closure of a building, comprising, in combination, output relay means, contact means on said output relay means and connectable to a voltage source, control means connected to control the actuation of said output relay means and corresponding to a given directional movement of the closure, switch means connected to actuate said control means, means for connecting one of said contact means and said switch means to the closure, and logic means connected between said switch means and said control means and responsive only to a plurality of closings of said switch means to activate said output relay means and the closing of said contact means.

The problem is further solved by a garage door operator having a motor and a drive train connectable to actuate a garage door between open and closed conditions, condition means establishing control of the motor and drive train for four conditions of opening movement, door open and stationary, closing movement, and door closed and stationary, control means to control the initiation of at least said opening and closing movement conditions, and switch means connected to said control means, the improvement wherein said control means includes means requiring a plurality of actuations of said switch means to initiate said door closing movement condition.

An object of the invention is to provide a safe garage door operator, especially in the closing direction.

Another object of the invention is provided by a closure operator which is effective in being moved in the closing direction only upon a plurality of actuations of a switch.

Another object of the invention is provided by an asymmetric sequence or control for a garage door wherein a single switch actuation is sufficient for actuating the door in an opening direction, but a different and multiple switch actuation is required to start the door moving in a closing direction.

Other objects and a fuller understanding of the invention may be had by referring to the following description and claims, taken in conjunction with the accompanying drawing.

DESCRIPTION OF THE PREFERRED EMBODIMENT

Figure 1:
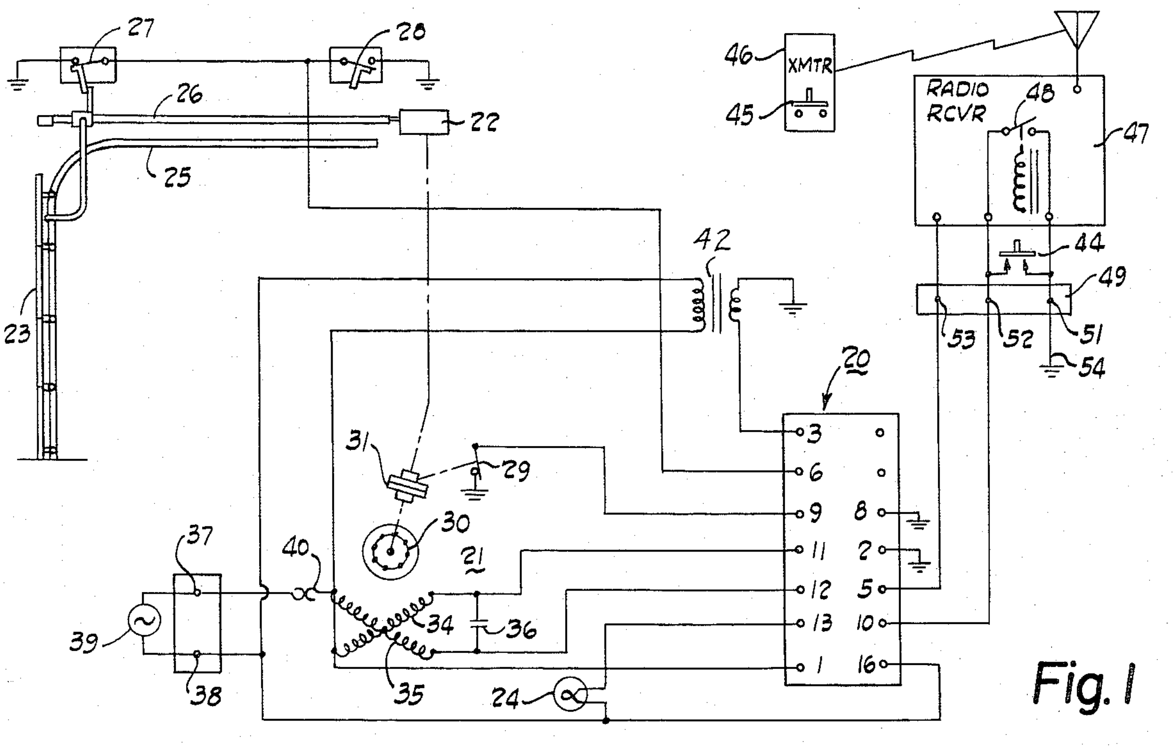
FIG. 1 is a schematic diagram of a sequencing control circuit for a door operator motor incorporating the invention.

FIG. 1 schematically illustrates a sequencing or condition control circuit 20 for a motor 21 connected in a door or closure operator 22, which in turn is connected to open and close a door or closure 23. The closure may be used for various purposes, for example to act as a window or to close access to a garage, and the door operator may have a lamp 24 to illuminate the interior of the garage. The door 23 is shown as movable on a track 25 by means of a drive mechanism, not shown, but within the door operator 22, and this drive mechanism may move a carriage along a channel 26 to actuate a down limit switch 27 and an up limit switch 28.

The motor 21 includes a rotor 30 connected through a friction clutch 31 to the door operator 22. A torque or overload switch 29 is connected on the load side of the clutch 31 to be responsive to overload conditions on the rotor 30. The motor 21 also includes stator windings 34 and 35 and a reversing capacitor 36. Energization terminals 37 and 38 are connected for energization from A.C. source 39 and energize the stator windings through a thermal overload device 40. A step down transformer 42 is connected for energization from the terminals 37 and 38 in order to provide a safe low voltage, e.g., in the order of 30 volts, to the sequencing control circuit 20.

Input switch means are provided for the control circuit 20 and include a manual push button switch 44 and a transmitter push button switch 45. The switch 45 is provided in a radio transmitter 46 which, when the switch 45 is actuated, emits a radio signal. A radio receiver 47 is provided and if both radio receiver and transmitter are on the same code and frequency, then a switch 48 in the receiver 47 will be closed. A terminal strip 49 includes terminals 51, 52, and 53. Terminal 53 is connected to the receiver 47 to supply an operating voltage thereto relative to terminal 51 which is the external ground 54.

The sequencing control circuit 20 is a multiterminal device and, in one embodiment manufactured in accordance with this invention, was a printed circuit board with terminals thereon. This was a 16-terminal device, but not all terminals required external connections. The terminals with external connections thereto are Nos. 1, 2, 3, 5, 6, 8, 9, 10, 11, 12, 13, and 16.

Figure 2:
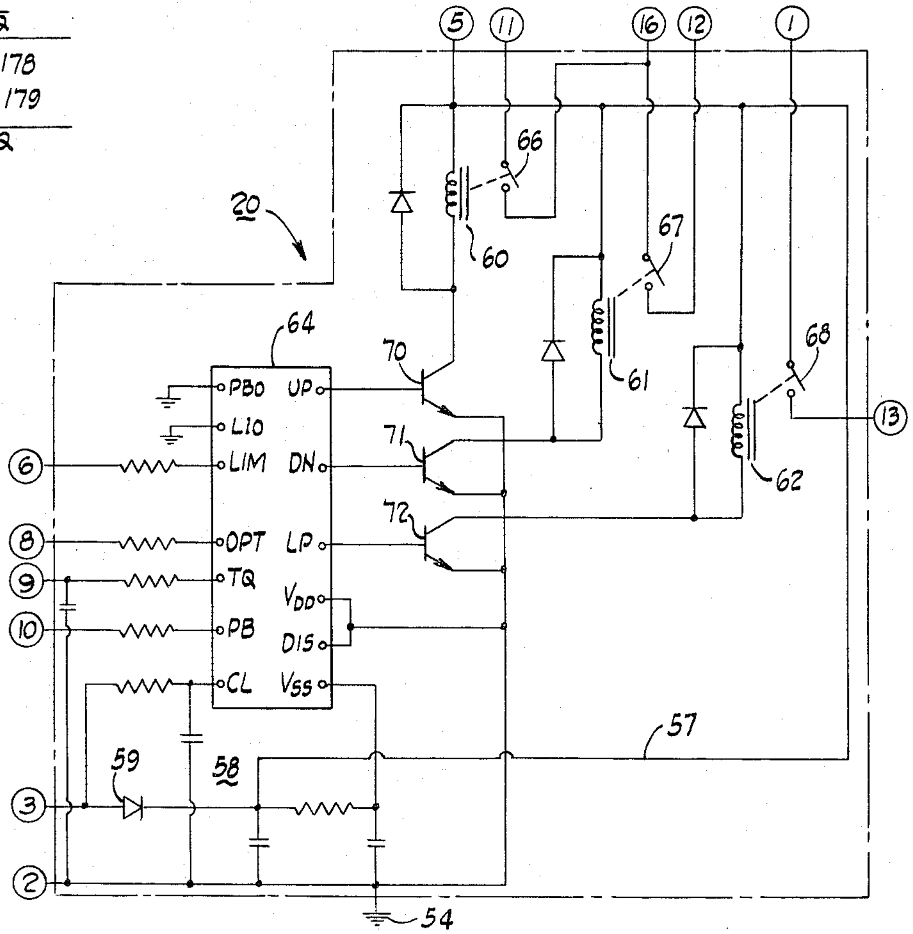
FIG. 2 is a schematic diagram of the sequencer used in FIG. 1.

FIG. 2 schematically illustrates the internal circuitry of the sequencing control circuit 20 with the same reference numerals on the terminals shown around the periphery of the circuit. This sequencing control circuit 20 includes a power supply 58 which includes a rectifier 59 supplying unfiltered D.C. on a conductor 57 to output relays 60, 61, and 62 and to terminal 5, which supplies power to the radio receiver 47 via terminal 53. The power supply 58 also supplies filtered D.C. power to a terminal $V_{ss}$ on a sequencer 64. The sequencer 64, described below, includes a number of gates, transistors and flip-flops and may be an integrated circuit. The power supply 58 has the same external ground 54 as is shown in FIG. 1. Thus, circuits FIGS. 1 and 2 are negative ground systems, whereas the sequencer 64, as described below, is a positive ground circuit.

The relays 60–62 control contacts 66–68, respectively. When relay 60 is energized, contact 66 is closed to complete the circuit between terminals 11 and 16. As shown in FIG. 1, this will energize stator winding 34 directly and stator winding 35 indirectly through capacitor 36 for motor rotation in the direction illustrated as the up direction for door 23. Energization of relay 61 closes contact 67 for a connection between terminals 12 and 16, which will provide a down direction of rotation of the motor 21. Energization of relay 62 closes contact 68 for a connection between terminals 1 and 13 to illuminate the lamp 24.

Each of the relays 60–62 is provided with a driver transistor 70–72, respectively. The emitters of transistors 70–72 are connected to the external ground 54, with the collectors connected to the respective output relays 60–62, respectively. The bases of these transistors are connected to sequencer terminals, respectively designated as UP, DN, and LP. When a base of a transistor is at the same potential as the emitter, then such transistor is turned off. When the base is positive relative to the emitter, the transistor is turned on to energize its respective relay and thus establish the respective function of motor energization up or down or lamp energized.

The sequencer 64 has additional terminals, including a limit terminal LIM, a lamp option input terminal OPT, a lamp input option terminal LIO, an overload torque input TQ, a push button input PB, a push button option terminal PBO, and a clock input CL. Each of these terminals is connected through a current limit resistor to sequencing control circuit terminals 6, 8, 9, 10, and 3, respectively. The sequencer 64 also includes a terminal $V_{DD}$ to supply operating voltages to some drains of FET transistors in the sequencer 64. A lamp delay disable terminal DIS is also provided in the sequencer 64 and these terminals $V_{DD}$ and DIS are connected to the external ground 54.

Figure 4:
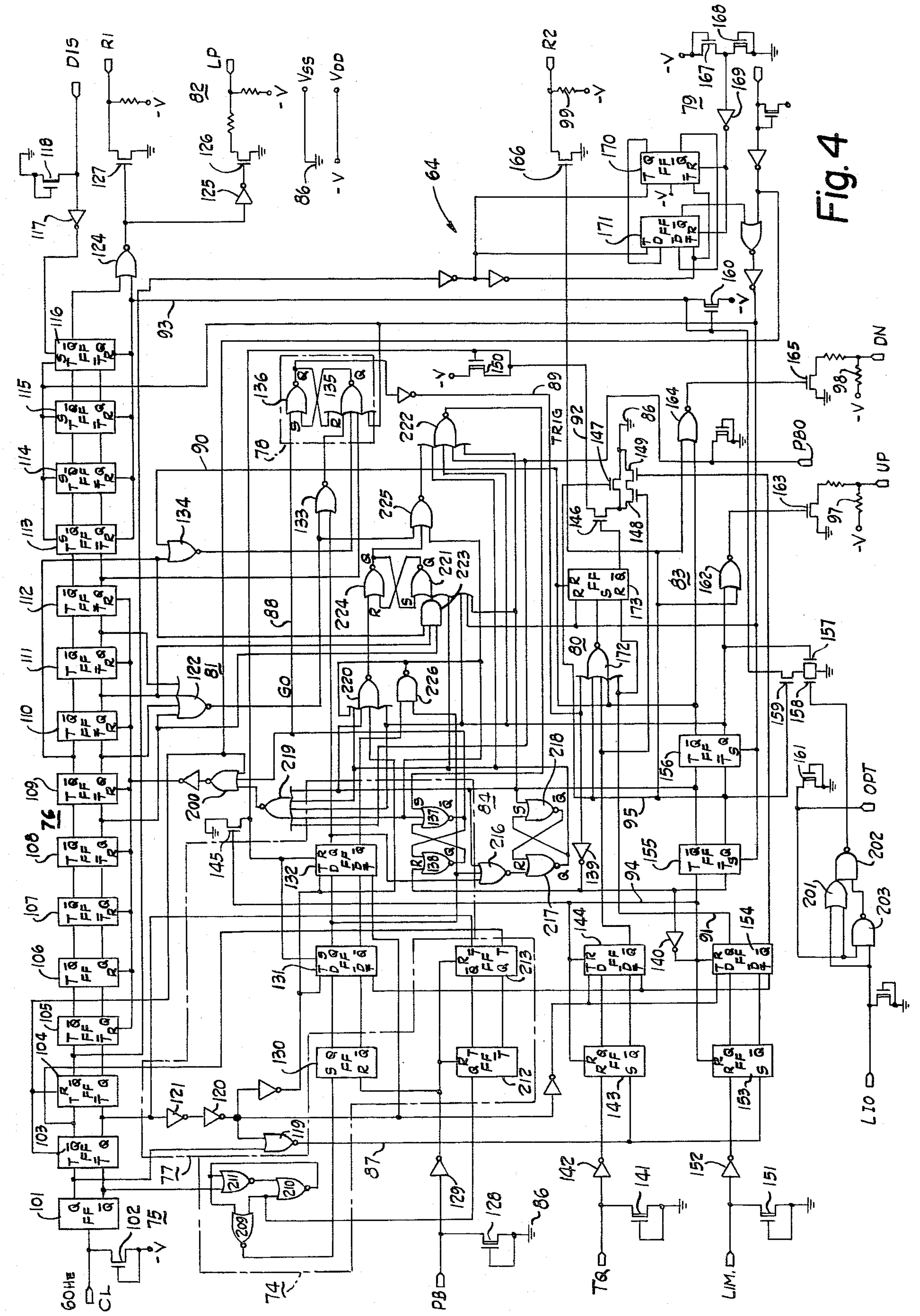
FIG. 4 is a schematic diagram of the integrated circuit used in the sequencer.

FIG. 4 is a schematic diagram of a sequencer 64 which may be used in the circuit of FIG. 2. Such sequencer is commercially available as Essex Group, a subsidiary of United Technologies Inc., Sequencer Timer Part No. 310, as an integrated circuit and packaged in a 16-pin DIP package. It is improved over the sequencer described in U.S. Pat. No. 4,119,896, issued Oct. 10, 1978. This integrated circuit logic may take different forms and, as shown in FIG. 4, the preferred embodiment includes many NOR gates, FET transistors of the PMOS type, and various flip-flops. Two different types of FET transistors are shown: the enhancement-mode type illustrated with a single bar, and the depletion-mode type with a double bar.

Input signals are provided at various terminals on the left side of FIG. 4, including terminals CL, PB, TQ, and LIM. Output terminals are shown at the bottom and right side of FIG. 4, and include UP, DN, and LP to control the up and down condition of the motor 21 and the lamp 24.

Generally, the sequencer 64 includes a clock circuit 75, a divider or counter circuit 76, a GO circuit 77, a debounce circuit 74, a trigger circuit 78, a power-up circuit 79, a safety reversal circuit 80, an enable circuit 81, a lamp delay circuit 82, an output circuit 83, and a double pulse circuit 84.

The clock circuit 75 obtains a timing frequency from some source and in this preferred embodiment, the timing source is obtained from the clock terminal CL which is the commercially available power frequency. In the United States, this is generally 60 Hertz. This incoming clock frequency is connected to a Schmitt trigger flip-flop 101. An enhancement mode FET transistor 102 is connected at the input of the Schmitt trigger 101 to the negative operating voltage −V. As shown at the right hand side of FIG. 4, this negative operating voltage is the $V_{DD}$ for the drain voltage. $V_{ss}$ is the source voltage of some FET transistors connected to internal ground 86. This is different from the external ground 54 because the circuits of FIGS. 1 and 2 are negative ground circuits and the circuit of FIG. 4 is shown as a positive ground circuit so that negative logic applies in FIG. 4.

The Schmitt trigger 101 supplies a signal to the toggle input of a T flip-flop 103. This flip-flop is one of a sequence of flip-flops 103–116 in the divider circuit 76.

The GO circuit 77 includes an inverter 121 and another inverter 120 connected in series from the Q output of flip-flop 103 to one of two inputs of a NOR gate 119. Another input of this gate 119 is supplied from the output of the Schmitt trigger 101. The output of the NOR gate 119 is supplied on a conductor 87 to the set input S of RS flip-flops 143 and 153, and the Q outputs thereof are connected to the data input D of D-type flip-flops 144 and 154. The push button input PB is connected through an inverter 129 to the reset input R of an RS flip-flop 130. Also, this push button input is biased to the internal ground 86 through a depletion-mode FET transistor 128. The gate of this transistor is also connected to internal ground. The GO circuit 77 further includes NOR gates 137 and 138, which together form a set-reset flip-flop. The GO signal appears on a GO signal conductor 88 which is connected through a NOR gate 200 to the reset terminals R of the flip-flops 105–112 and is also connected to an input of a NOR gate 136 connected in a latch configuration to a NOR gate 135. The output from the NOR gate 135 is a trigger signal TRIG appearing on a trigger conductor 89, which supplies a trigger signal to the output circuit 83.

The enable circuit 81 includes a four-input NOR gate 122 having inputs from the Q outputs of each of the flip-flops 108–111. The output from NOR gate 122 is supplied to one input of a NOR gate 133 and the other input is supplied from the Q output of flip-flop 132. The output of NOR gate 133 is supplied to one of the inputs of the NOR gate 135. Another input comes from the Q output of flip-flop 112. Still another input comes from the output of a NOR gate 134. The NOR gate 134 has an input from the $\overline{Q}$ output of flip-flop 109. Another input of NOR gate 134 comes from a conductor 90 from the output circuit 83.

The torque input TQ is an incoming signal coming from the torque switch 29 and is biased to ground through a depletion-mode FET transistor 141 in a manner similar to the push button input PB. The TQ signal is also applied through an inverter 142 to the reset input R of the RS flip-flop 143. The $\overline{Q}$ output of flip-flop 143 is applied to the inverted data input $\overline{D}$ of the D-type flip-flop 144. The $\overline{Q}$ output of flip-flop 144 is connected to one of five inputs of a NOR gate 172 in the reversal circuit 80.

The limit switch input LIM receives an input signal from the limit switches 27 or 28 and is biased to ground by a depletion-mode FET transistor 151 in a manner similar to the push button input PB. This limit switch input LIM is connected through an inverter 152 to a reset input R of the RS flip-flop 153. The $\overline{Q}$ output of this flip-flop is connected to the inverted data input $\overline{D}$ of the flip-flop 154. The $\overline{Q}$ output of this flip-flop is connected to a conductor 91 leading to the reversal circuit 80. The Q of flip-flop 154 is also connected to the reversal circuit 80.

The reversal circuit 80 includes the NOR gate 172, which has an output connected to the set input S of an RS flip-flop 173. This reversal circuit also includes enhancement mode FET transistors 145–149. The $\overline{Q}$ output of flip-flop 173 is connected to the gate of transistor 146. This transistor is connected to the internal ground 86 by the series-connected transistors 148 and 149. The other end of transistor 146 is connected to a conductor 92. The transistor 145 is connected between this conductor 92 and the internal ground and a depletion-mode FET transistor 150 is connected between this conductor 92 and the operating voltage source −V. The transistor 147 is connected in parallel with the series transistors 148 and 149.

The power-up circuit 79 includes an enhancement-mode FET transistor 167 connected in series with a depletion-mode FET transistor 168 between −V and internal ground. At the junction between these two transistors the input of an inverter 169 is connected, the output of which is connected to reset terminals R of D flip-flops 170 and 171. The Q output of flip-flop 170 is connected to the data input D of flip-flop 171 and the $\overline{Q}$ output of this flip-flop is connected to the set inputs of RS flip-flop 155 and 156.

The trigger signal conductor 89 is connected through an inverter 139 to one of the inputs of the NOR gate 138. The conductor 89 is also connected through inverters 139 and 140 to a conductor 94 which is connected to the reset terminals R of the flip-flops 143, 144, 153, and 154.

The output circuit 83 includes the previously mentioned T flip-flops 155 and 156 with the trigger conductor 89 connected to the toggle terminal T of the flip-flop 155 through the inverters 139 and 140. The Q output of this flip-flop is connected to the toggle terminal of the next flip-flop 156. The $\overline{Q}$ output of flip-flop 156 is connected to an input of a NOR gate 162 and the $\overline{Q}$ output of flip-flop 156 is connected to an input of another NOR gate 164. The Q output of flip-flop 155 is connected by a conductor 95 which is connected to the remaining inputs of NOR gates 162 and 164, is connected to the gate of transistor 147, and is connected to one of the five inputs of the NOR gate 172.

The output of NOR gate 162 is connected to the gate of an enhancement mode FET transistor 163, with the source connected to internal ground and the drain connected to the output terminal UP and also connected through a resistor 97 to the voltage terminal −V. NOR gate 164 output is connected to the gate of enhancement mode FET transistor 165, the source of which is connected to ground. The drain thereof is connected to the output terminal DN and is also connected through a resistor 98 to the operating voltage terminal −V.

The output circuit 83 is also provided with a regulator transistor 166, with the gate thereof connected to conductor 95, the source connected to internal ground and the drain connected to a regulator terminal R2 and also connected through a resistor 99 to the −V terminal.

There is also a lamp option input terminal OPT which is connected through an OR gate 201 combined with a NAND gate 202 to a complex gate consisting of three enhancement-mode FET transistors 157–159 and a depletion mode transistor 160. The option terminal OPT is also connected through a depletion-mode FET transistor 161 to ground. A lamp invert option input LIO is connected through a NAND gate 203 to an input of gate 202. Transistors 157 and 158 are connected in parallel to ground. Transistors 160 and 159 are connected in series with this parallel combination to the operating voltage −V. The gate of transistor 157 is connected to the Q output of flip-flop 156 and the gate of transistor 159 is connected to the Q output of flip-flop 155.

A lamp output may be considered as a part of the output circuit 83. This lamp output includes the lamp delay circuit 82, which has a two-input NOR gate 124 supplying an inverter 125 in turn supplying the gate of an enhancement-mode FET transistor 126. This transistor is connected through a pull-up resistor 96 to the operating voltage −V and the source is connected to the internal ground. The junction beween resistor 96 and the transistor is connected to the lamp output terminal LP.

A lamp delay disable terminal DIS may be connected to the operating voltage −V, and is connected through an inverter 117 to the set input of the D flip-flop 116. The delay disable input terminal DIS is also connected through a depletion-mode FET transistor 118 to the internal ground. The output of NOR gate 124 is connected to a regulator transistor shown as an enhancement mode FET transistor 127. The drain of this transistor is connected to a regulator terminal R1 and is also connectd through a pull-up resistor to the operating voltage −V. The source of this transistor is connected to the internal ground.

Figure 3:
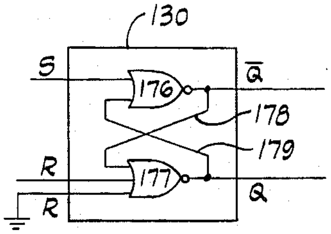
FIG. 3 is a schematic diagram of a latch circuit.

FIG. 3 illustrates the internal circuit of the RS flip-flop 130. It includes NOR gates 176 and 177 with a set input S to one input of gate 176 and this gate supplying the $\overline{Q}$ output. The output of gate 176 is connected by a conductor 178 to an input of the NOR gate 177 and the output of this gate 177 is connected by a conductor 179 to an input of the gate 176 for a latch configuration. The output of gate 177 supplies the Q output of the flip-flop 130. Two reset input terminals R are connected to inputs to the NOR gate 177. In the circuit of FIG. 4, only one reset input is used, in which case the other reset input terminal is connected to the internal ground 86. In FIG. 4, the flip-flops 143 and 153 are ones which use two separate reset terminals, and these would be flip-flops as illustrated in FIG. 3.

The debounce circuit 74 includes NOR gates 209, 210, and 211 with an input of gate 211 from the $\overline{Q}$ terminal of the Schmitt trigger 101. Gate 211 has an input to gate 210 which has an output to another input of gate 211. The Q output of a T flip-flop 212 is connected to an input of both gates 209 and 210. The output of gate 209 is connected to the set input of the flip-flop 130. The debounce circuit 74 further includes another T flip-flop 213. The $\overline{Q}$ output of flip-flop 103 is connected to the $\overline{T}$ input of the flip-flop 213 and the Q output thereof is connected to the T input of flip-flop 212. The push button imput PB goes through the inverter 129 and is connected to the reset inputs of the flip-flops 212 and 213.

The double pulse circuit 84 includes NOR gates 216–218 with gates 217 and 218 connected as an RS flip-flop, the set inputs being to gate 218 and the reset input being to gate 217. The output of gate 217 is the Q output and the output of gate 218 is the $\overline{Q}$ bar output. Other components of the double pulse circuit 84 include NOR gates 219–222, each of which has an input from the Q output of the RS flip-flop 217,218. Gate 219 supplies an output to an input of gate 200. The NOR gate 221 is part of a compound gate having an AND gate 223 as an input thereof. A NOR gate 224 is interconnected with gate 221 as another RS flip-flop, the set input and $\overline{Q}$ output being on gate 221 and the reset and Q output being on gate 224. This Q output supplies an input to another NOR gate 225 and the output thereof supplies an input to the gate 222. A NAND gate 226 has an input from the Q output of flip-flop 131, and has another input from the $\overline{Q}$ output of flip-flop 132. The output of this gate 226 supplies an input to the gates 220 and 225, and the set input of gate 137.

OPERATION

The sequencer 64 shown in FIG. 4 is a digital control circuit, which may be an integrated circuit mounted on a single chip of silicon. Since this chip may be quite tiny, for example 0.01 square inches, the power dissipating capabilities of such chip are small and typically may be ten milliamperes at 15 volts. The circuit shown in FIG. 4 in this preferred embodiment is using PMOS technology, and primarily using FET transistors. Negative logic is used to describe this PMOS technology because the operating voltage is a negative voltage, e.g., 15 volts, relative to internal ground 86, which is zero volts. This means that the logic conditions of zero and one or low and high correspond to ground and −V, respectively.

Two different types of FET transistors are used, with transistor 102, for example, being an enhancement-mode transistor and illustrated with a single bar connecting drain and source. Transistor 128, for example, is a depletion-mode FET transistor and is illustrated in the drawing with a double bar connecting the drain and source. The enhancement-mode transistor such as transistor 102 has zero drain current for a zero source to gate voltage. The depletion-mode FET transistor, on the other hand, does have a definite conduction even at zero source to gate voltage, and hence acts like a resistor permitting current flow therethrough.

The D or data flip-flops in the circuit of FIG. 4, such as flip-flops 131 and 132, are flip-flops with a toggle T and with data input D, and when the flip-flop gets a toggle input, the Q output goes to whatever the D input is at that time. The toggle flip-flops, such as flip-flops 103–115, are ordinary flip-flops wherein the Q output changes each time there is a toggle input.

The RS flip-flops, such as 130 and 143, are reset to Q=0 by a logic one on the reset terminal R. If the logic one remains on R, then when a logic one is applied to the set terminal S, $\overline{Q}$ changes from one to zero, but Q cannot change to one. If the one on R is removed, then when a one is applied to S, this sets the flip-flop, and Q changes to a one.

Referring to FIG. 1, when the push button 44 is depressed or the radio receiver switch 48 is closed, this provides an input signal from these manual switch means to change the condition of the door operator motor 21. Assuming first that the door 23 is closed and the motor 21 is deenergized, then the sequence of operation includes the four conditions of door opening movement, door open and stationary, door closing movement, and door closed and stationary. For the upward opening garage door, this may be considered as run up, stop up, run down, and stop down. A truth table for the Q outputs of flip-flops 155 and 156 in FIG. 4 and the above four conditions is as follows:

| 155 | 156 | Condition |
|---|---|---|
| 0 | 0 | run up |
| 1 | 0 | stop up |
| 0 | 1 | run down |
| 1 | 1 | stop down |

With A.C. source 39 supplying power, the sequencing control circuit 20 of FIG. 1 and FIG. 2 will control energization of the motor 21 and of the lamp 24. This A.C. source will supply power at a low voltage, e.g., 24 volts, to terminals 2 and 3 of the sequencing control circuit 20. This in turn supplied lightly filtered D.C. power to energize the relays 60–62 and power to the radio receiver 47. Filtered D.C. power is also supplied at the $V_{ss}$ terminal of the sequencer 64. As shown at the right side of FIG. 4, this $V_{ss}$ terminal is the internal ground 86, so that the circuit of FIG. 4 is positive ground and the circuit of FIG. 2 is negative ground as determined by the external ground 54.

Considering first the output circuit 83 of FIG. 4, the above truth table shows that in the stop down condition the Q outputs of both flip-flops 155 and 156 are in a logic one condition. Flip-flop 155 may be considered the run or stop flip-flop and flip-flop 156 may be considered the up or down flip-flop. In this preferred embodiment, the motor 21 may be made to run in the run up condition by a trigger signal on the trigger conductor 89, which toggles flip-flop 155. This changes the $\overline{Q}$ output to a one which toggles the flip-flop 156, changing the Q output from a one to a zero. In the NOR gates shown in FIG. 4, conventional logic is used, i.e., any logic one on an input creates a zero at the output thereof, and all zeroes on the input create a one on the output. This logic zero on the Q of 156 causes NOR gate 162 to change state to a logic one output. This turns on transistor 163. Previously, when the motor was deenergized, the output terminal UP was at a logic one condition because it was tied through pull-up resistor 97 to the operating voltage −V. Now that the transistor 163 is turned on, this UP terminal goes to a logic zero. Referring now to FIG. 2, this logic zero condition is internal ground, which externally is the positive DC voltage of the power supply 58. This positive voltage on the base of transistor 70 turns on this transistor 70, which in turn energizes relay 60 and closes contact 66. This makes a connection between terminals 11 and 16, and hence the motor rotor 30 runs in the up direction to open the door 23.

Similarly, for a run down condition of the door 23, the $\overline{Q}$ output of flip-flop 156 goes to a zero and Q of flip-flop 155 goes to zero. Thus, NOR gate 164 output changes state to a logic one, transistor 165 turns on and the terminal DN goes to a logic zero, turning on transistor 71 and relay 61 of FIG. 2, which closes the circuit between terminals 12 and 16. Accordingly, what is wanted is a trigger signal on the trigger conductor 89 in order to get the flip-flops 155 and 156 to be toggled.

The manual switches 44 and 45 normally control the inputs to start the motor 21, and the load switches 27, 28, and 29 normally stop the motor; however, these functions may be reversed, e.g., the manual switches 44 or 45 may also be used to stop the motor.

The sequencing control circuit 20 provides these functions in proper sequence, and also controls the lamp 24, plus providing a lamp delay function. In addition, the sequencing control circuit 20 ignores obvious, unintentional or false commands, such as shorted push button wiring or push buttons 44 or 45 held on for too long a time period, and permits normal functions of the limit and torque switches 27–29. The sequencing control circuit 20 does not respond to false noise commands that might be electrically or mechanically generated, such as induced 60 Hertz voltage or contact bounce.

In FIG. 4, the clock frequency is shown as being obtained from the 60 Hertz power line. The Schmitt trigger 101 eliminates power line jitter so that induced voltage or other false noise commands do not affect the sequencer 64. The transistor 102 is a transistor which limits the input voltage to a few volts in excess of the operating voltage −V, which for example might be −15 volts. This assures that the integrated circuit voltage maximums are no exceeded.

The clock frequency from the clock circuit 75 is passed to the divider or timing counter circuit 76. This generates from the clock frequency all of the various time delay periods desired within the sequencer 64.

One-thirtieth of a second timing periods are generated from the Q output of flip-flop 103, and these are passed by the inverters 121 and 120 NOR gate 119 which supplies the set pulses to the flip-flops 143 and 153. These 1/30 of a second timing periods are used for noise rejection at the torque input TQ, and the limit input LIM. The $\overline{Q}$ output of flip-flop 104 provides 1/15 second pulses to power-up D flip-flops 170 and 171. The toggle-counter string of flip-flops 105–112 provides successively longer timing pulses. The flip-flop 108 has a timing period of about one second, and since the pulse is one-half of the period, this provides a one-half second timing pulse to NOR gate 122. The counters 109–111 are included in this timing so that only one pulse occurs in an eight and one-half second period. Also from the Q output of flip-flop 112 a timing pulse of about 8.5 seconds is supplied to the NOR gate 135. The flip-flop 116 provides a timing pulse at the $\overline{Q}$ output of approximately 136 seconds. This is used for lamp deenergization delay.

The power-up circuit 79 is used to make certain that the sequencing control circuit 20 is always powered or energized in the stop down condition of the motor 21. This is distinguished from the prior art electromagnetic relays. In such prior art systems, if the power were somehow interrupted during the run up condition of the motor and then power restored, the normally closed torque switch, similar to switch 29, would provide another impulse to the actuating coil of the electromagnetic stepping relay, which would index the relay into the stop up condition, even though the door was partly up. The limit switch 27 is shown closed in FIG. 1, and it may or may not be closed; but if closed, it could create the same condition as the normally closed torque switch 29. Next, if the push button 44 were depressed to start the motor, the motor would start in the run down mode, which could be a dangerous condition. The present sequencing control circuit 20 eliminates this hazard. As the A.C. source 39 is first applied to the step down transformer 42, the rectifier 59 would begin to conduct current and the capacitors in the D.C. filter would begin to charge. This means that the power supply of voltage −V is increasing as a ramp-like voltage. In FIG. 4, the power-up circuit 79 shows that this voltage −V is applied to transistor 167. Initially, the output of inverter 169 is a logic one which resets the D flip-flops 170 and 171. The input to inverter 169 is a logic zero because the depletion mode transistor 168 conducts to ground and the enhancement mode transistor 167 is not conducting until the voltage −V increases to be more negative than the threshold voltage of transistor 167. The input to inverter 169 effectively remains a logic zero until this negatively increasing operating voltage −V increases to be more negative than the sum of the thresholds of transistor 167 and inverter 169. During this time, the flip-flops 170 and 171 are reset by a logic one on the reset inputs thereof so that the Q outputs of the flip-flops is a logic zero, and thus $\overline{Q}$ of flip-flop 171 is a logic one which is used as a power-up reset. This logic one goes to the two filp-flops 155 and 156 in the output circuit 83, thus setting them so that both Q outputs are ones. According to the truth table set forth above, this is a stop down condition of the motor 21.

As the operating voltage −V further increases in negative magnitude, it becomes negative enough to overcome the thresholds of transistor 167 and inverter 169 and the input to inverter 169 effectively becomes a logic one; thus, its output becomes a logic zero and no longer resets the flip-flops 170 and 171. However, they have previously been reset. The $\overline{Q}$ of flip-flop 171 remains a logic one, which, in addition to setting the flip-flops 155 and 156, also resets the flip-flop 173.

The D or data input of flip-flop 170 is connected directly to a logic one which is the −V voltage. The first negative transition of the 1/15 of a second pulse from the Q output of flip-flop 104 toggles flip-flop 170 to a one state at the Q output. The next negative transition of the 1/15 of a second line toggles the logic one, now at the D input of flip-flop 171, to its Q output. The $\overline{Q}$ output which is the power-up reset is now a logic zero and remains a zero until the next time power is first applied. It will be noted that all flip-flops with toggle inputs or D inputs are clocked upon the negative going logic one transition of the toggle input.

The GO circuit 77 provides input noise rejection and debounce circuit 74 provides debounce of input contacts. The PB, TQ and LIM inputs contain three identical noise rejection circuits, but there is only one debounce circuit 74. The inverter 129 and flip-flops 130 and 131 are the noise rejection devices for the PB input. It will be noted that the radio receiver 47 is also connected to the push button PB input. In a similar manner, inverter 142 and flip-flops 143 and 144 act for the TQ input and inverter 152 and flip-flops 153 and 154 act for the LIM input.

Figure 5:
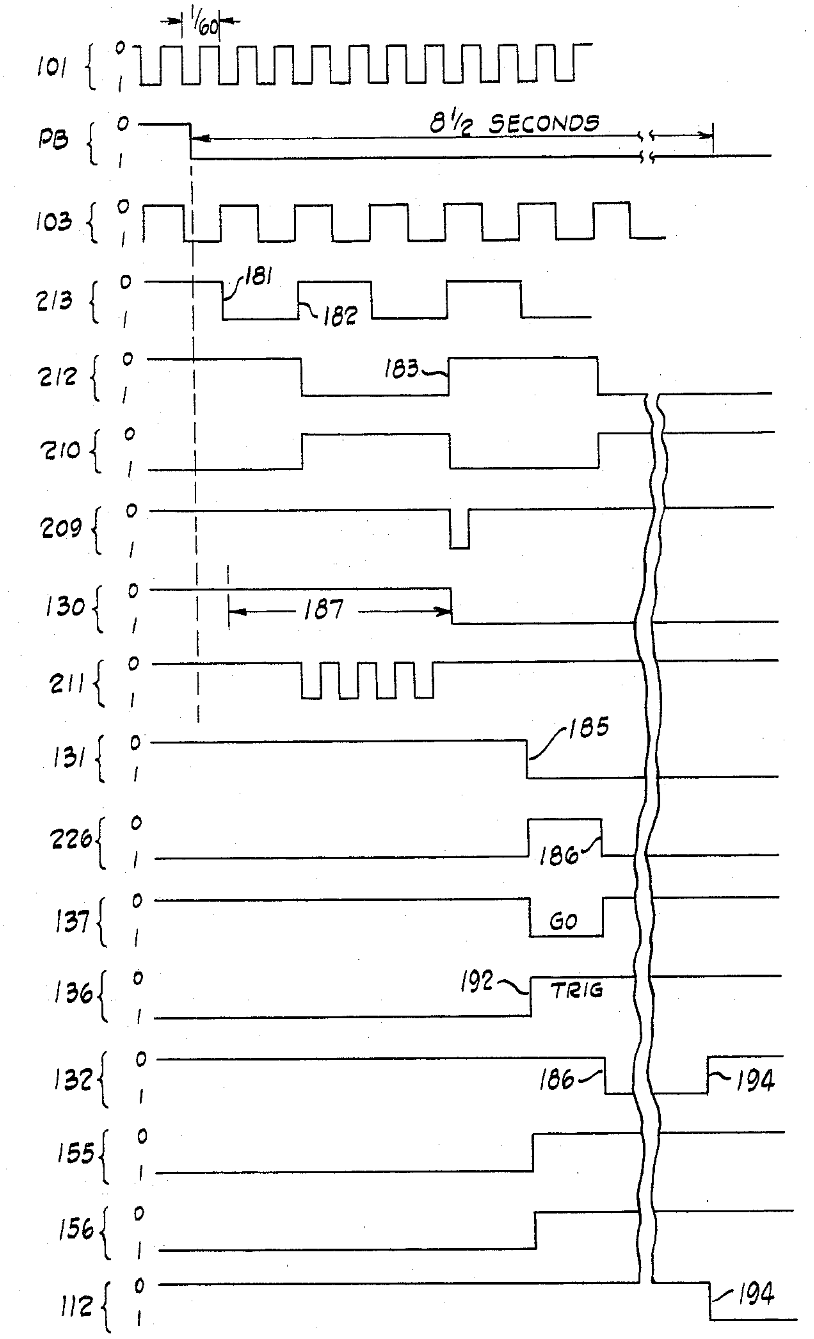
FIG. 5 is a graph of logic voltages appearing at various points in the circuit of FIG. 4.

The output of inverter 120 clocks data from flip-flop 130 into flip-flop 131. Also, inverter 120 controls the NOR gate 119. FIG. 5 shows a graph of the pulses making up the zero and logic one, with the logic one condition shown as negative of the zero because of the negative logic used in FIG. 4. The 1/60 of a second timing periods are shown from the output of the Schmitt trigger 101 and, of course, this means that the pulses are one-half this or 1/120 of a second. The output of NOR gate 119 on conductor 87 makes the transition to logic one synchronized with inverter 121, but it is delayed by 1/120 of a second by the output of the Schmitt trigger 101.

A command at the push button input PB is in the form of a switch closure to external ground, which is a switch closure to −V or a logic one. During switch open condition, the depletion mode transistor 128 acts like a resistor and pulls the PB input, the input of inverter 129, to a logic zero; thus, the output of inverter 129 is a logic one which resets the flip-flop 130. As long as there is a time when the push button input is a logic zero during the 1/60 of a second that inverter 121 is a logic zero, flip-flop 130 will be reset and inverter 121 will clock a logic zero into flip-flop 131. Thus, no command will be recognized.

The debounce circuit 74 is synchronized with the clock circuit 75 and provides protection to the PB signal from contact bounce, which might provide a double signal instead of a single signal. When the push button is open, the output of inverter 129 is a one which resets all of the flip-flops 130, 212, and 213 so that Q=0. Gates 209 and 210 are enabled from flip-flop 212. The Schmitt trigger 101 is alternating up and down and when gate 211 is driven to a zero output, this makes a one output on gate 210, which disables gates 209 and 211 from that time on. This is the normal condition, awaiting a PB signal.

When the push button is pressed to give a PB signal, it goes to a one and the inverter 129 output goes to a zero to remove the reset on flip-flops 130, 212, 213, so they can now be set. When next the $\overline{Q}$ of flip-flop 103 goes to a one, this toggles flip-flop 213 to make Q=1 and $\overline{Q}$=0 at time 181. When flip-flop 213 is next toggled at time 182, flip-flop 212 Q output goes to a one. This disables gate 210, forcing its output to a zero. Gate 211 is enabled and it now alternates in phase with the flip-flop 101.

When flip-flop 212 is next toggled at time 183, then 212 Q goes to zero and gate 210 output goes to a one. The two zeroes on the input of gate 209 make the output a one, and flip-flop 130 is set to Q equals a one. At time 184, just 1/120 second later, gate 211 goes to a zero, and two zeroes on gate 210 make it a one, which drives gate 209 to a zero and disables this gate 209. Thus, the set on flip-flop 130 is removed, but the Q output remains a one. When next, at time 185, the Q of flip-flop 103 goes to a zero, this toggles flip-flop 131 so that its Q equals a one. This starts the PB signal on its way through the circuit. At time 186, 1/30 of a second later, flip-flop 132 is toggled so its Q output is a one. Any noise pulse or contact bounce on the PB input which is less than the time period 187 of 6/60 of a second will be ignored because flip-flops 130, 212 and 213 will be reset.

Assume first that the sequencer 64 is in the stop down condition. Now, when a genuine input signal appears from the push button input PB as described above, the signal passes through the debounce circuit 74 to set the flip-flop 130 at time 183. One-sixtieth of a second later, flip-flop 131 is toggled. The $\overline{Q}$ of flip-flop 132 will at that time be a zero. The Q of flip-flop 132 will have been a one, since flip-flop 132 is clocked by inverter 121, and therefore still contains a previous zero on the data D from flip-flop 131. Thus, the NAND gate 226 is enabled by two ones on the inputs and the output of gate 226 will go to a logic zero. This acts through gates 225 and 222 to remove the set from the flip-flop made of gates 137 and 138, so its $\overline{Q}$ output of 137 goes to a one. This is a GO pulse on conductor 88. This logic one goes through gate 200 to reset all of the counters 105–112. Also, it changes the NOR gate 136 to a logic zero. This is the trigger signal shown at 192 on FIG. 5 and is the trigger signal, as mentioned above, to change the state of the output circuit 83. This trigger pulse clocks the flip-flop 155 from a run to stop mode or from a stop to a run mode. If flip-flop 155 is clocked to a run mode, the output thereof clocks flip-flop 156 from an up to a down mode or from a down to an up mode.

Next, 1/30 of a second after the flip-flop 131 is clocked, the logic one in flip-flop 131 is clocked by inverter 120 into flip-flop 132. Thus, NAND gate 226 goes to a one, which sets the flip-flops 137–138. The $\overline{Q}$ output of gate 137 is now a zero, which removes the reset from the counters 105–112, so that it again starts timing.

The Q of flip-flop 132 goes to a logic zero when the PB input is zero and tries to enable NOR gate 133 which would turn off NOR gate 135 and thus terminate the trigger signal. The NOR gate 122 prevents gate 133 from going to a logic one for one-half second after the GO signal so that any command is not recognized more often than two times per second; thus, the maximum sequence rate is two times per second.

For the next one-half second, any commands from the push button, torque or limit switches are ignored. At the end of one-half second of the counter again operating, the inputs on the gate 122 are in the proper state of all zeroes, and gate 122 has an output of a one. This goes through gate 133 and resets the flip-flop 135,136 if the push button switch PB is open.

If the push button is not open, then a person has to wait one second if the door is traveling down, or wait 8.5 seconds if the door is traveling up, for a reset of flip-flop 135,136 to occur. A reset of this flip-flop removes the inhibit, the one, on gate 172, allowing it to recognize signals from TQ or LIM.

The reset of flip-flop 135,136 also resets flip-flop 137,138. This sets flip-flop 135, 136 so that $\overline{Q}$ equals zero, and this triggers the run/stop flip-flop 155 and the up/down flip-flop 156, so the sequence is in the run-up mode.

The signals from TQ and LIM produce a GO by setting flip-flop 131 and resetting flip-flop 132 via the complex gate composed of driver or enhancement mode transistors 145 through 149 and the depletion mode load transistor 150. The TQ or LIM inputs can produce a GO signal only during the run mode, since the Q output of flip-flop 155 feeds a logic one to the gate of transistor 147 to turn it on during a stop mode, and neither a logic zero at transistor 149, which occurs when the TQ signal is a logic one, nor a logic zero at transistor 148, which occurs when the LIM input is a logic one, can produce a GO signal. Also, the trigger signal at conductor 89 feeds transistor 145 via inverter 140 so that inputs at TQ or LIM cannot produce a GO for a minimum of the first one-half second of any run mode.

The circuit provides a delay of deenergization of the motor 21 after actuation of the LIM switches, in order to have the door, in the run down mode, continue to exert a force toward closing against a door sill. This delay helps to close the door against any snow that might be present on the door sill. This delay, is this embodiment, is about 1/30 of a second established by the delay of toggling of flip-flop 154 after the setting of flip-flop 153. This is similar to the delay described above between the setting of flip-flop 130 and toggling of flip-flop 131.

Double Pulse Circuit

The double pulse circuit 84 comes into use when the sequencer 64 is in the stop up mode. If the push button option PBO is ungrounded from internal ground, this removes the one on gate 222, enabling it. Now gates 216, 217, 218, 219, 225, 221, 224, and 220 are permitted to act. The purpose is to require a double actuation of the PB signal to cause the door to run toward closing, which double closing is different from or asymmetric with the single actuation of PB required for door opening. This makes a safer arrangement, minimizing the possibility of an accidental switch actuation causing the run/down mode, which possibly can be dangerous if a small child, for example, is in the path of the closing door.

In this condition of gate 222 enabled and in the stop up mode, the flip-flop 221,224 stores the information that a first PB signal has been received. This is accomplished by being set to $\overline{Q}=0$ on the output of gate 224. The steps by which this occurs are that when a first PB signal is received, the signal passes to the flip-flops 131 and 132, as described above. However, the signal does not go through gate 226 to flip-flop 137–138 as before; instead, it goes from gate 226 to enable gate 220. The output of gate 220 is now a one to reset the flip-flop made of gates 221 and 224. The zero output of gate 224 is the Q output, and it stores the information that a first PB signal has been received.

The first PB signal must terminate within a first predetermined period, in this example set at one-half second; and the second PB signal must be received within a second predetermined period from the start of the first PB signal, in this example set at 2.5 seconds.

When the first PB signal ends, if within one-half second, it resets the flip-flop 217,218, just like flip-flop 137,138 was reset, when flip-flop 132 goes to a one and flip-flop 131 already has a one. This restarts the counter by removing the reset thereon through gates 219 and 200.

If, during the predetermined period of ½ second to 2.5 seconds after the PB is first closed, the PB is again closed, then this second PB signal is passed from gate 226 through gate 225 if the first PB signal has been stored in flip-flop 221,224 to make the Q output thereof a zero. The one-half second minimum comes from gate 122 to enable gate 225, so in that case the signal will pass through. The 2.5 second maximum comes from AND gate 223 to gate 221, and after 2.5 seconds, the flip-flop 221,224 gets set. This may be considered to be like removing the conditions that have had the first PB signal.

If the second PB signal is in the proper window of time opening, which may be varied by connecting at various points on the counters, then it passes through gate 225 to enable gate 222. The second PB signal lasts for 1/60 of a second, when Q of flip-flop 131 is a one and the $\overline{Q}$ of flip-flop 132 is a one so that the output of NAND gate 226 is a zero. On-sixtieth of a second later, flip-flop 132 is toggled to have the Q equal one, and then the gate 226 output goes to a one to disable gate 225. With the second PB signal coming through at the proper time, however, gate 226 has a output for 1/60 of a second, which gives a one output from from gate 225 and a zero output from gate 222. This removes the set from flip-flop 137,138, putting a GO signal on GO conductor 88 and a trigger signal on the TRIG conductor 89. From this point on, the output circuit 83 is toggled, just as it was with the single PB signal when in the stop-down condition.

Safety reversal of the door 23 upon an overload condition during a run down mode is provided so that should a child or a pet animal become caught underneath the door, the door will not only stop, but will reverse and return upwardly. This safety reversal is provided by the reversal circuit 80, which includes the five input NOR gate 172. The gate 172 is normally a logic zero output to not set flip-flop 173. The gate 172 has a logic one output if all inputs are zero, and this logic one output will set the flip-flop 173 if all of the following are true:

1. LIM input is a logic zero.
2. Flip-flop 156 is a logic one, signifying the down mode.
3. Flip-flop 155 is a logic zero, signifying a run mode.
4. TQ input is a logic one.
5. TRIG signal is its normal zero.

It will be noted that the LIM and TQ inputs are inhibited by the trigger signal on conductor 89 via inverters 139 and 140, which resets flip-flops 143, 144, 153, and 154, therefore preventing any LIM or TQ response during the first one-half second of run.

Now if a child should get caught underneath the door while it is descending, this will overload the clutch 31, causing it to slip and causing the torque switch 29 to close. This provides an input at TQ during run down, and will produce a stop down mode for one-half second and then a run up mode for at least one-half second or until another command is recognized. The stop down mode was produced by the TQ input going to logic one, which set flip-flop 73, turning off transistor 146, and thus making conductor 92 a logic one; and this set flip-flop 13 and reset flip-flop 132 for a GO signal. The run up mode was produced because the flip-flop 173 was formerly a logic one and turned off transistor 146, producing a GO signal when the trigger signal on conductor 89 went to a logic zero and turned off transistor 145. The flip-flop 173 is reset by flip-flop 156 when in the logic zero or up mode.

The enable circuit 81 enables connecting a time delay to the motor energization control so that the time delay means enable control of the motor by a signal from the load switches which are the limit switches or torque switch. Also, this enable circuit 81 disables control of the motor by a constant signal from any of the input switches which exceeds a first time delay period. In the preferred embodiment, this first time delay period is set at about eight and one-half seconds in the run up mode as determined by the Q output of flip-flop 112, and is set at about one second in the run down mode as determined by the $\overline{Q}$ output of flip-flop 109.

If the PB input is a logic one continously, such as might happen if switch wire is short-circuited to ground, if a transmitter switch is stuck, or a rake accidentally leans against the push button 44, then the flip-flops 131 and 132 will remain at a Q output of logic one and will not be able to turn off the gate 136 nor the trigger signal at conductor 89. The Q output of flip-flop 112 feeds the NOR gate 135 so that after 8.5 seconds, the trigger signal will become a logic zero no matter what else happens, and then the TQ or LIM input signals can be recognized by the sequencer 64. This occurs as shown on FIG. 5 at time 194. The NOR gate 134 provides the same function after only one second if the sequencer is in the down mode. This one second override of the PB input signal in the down mode allows reversal upon TQ equaling a logic one after only about seven inches of door movment for a typical garage door operator. A continuous PB input signal equaling a logic one will not produce two trigger signals on conductor 89 even if the power is turned off and then turned back on. By this enable circuit, the door cannot run past the limit switches with the switches having no effect on the circuit. This would be a dangerous condition, and was possible with the prior art arrangements.

The lamp 24 may be controlled in a variety of ways, including time delay of the deenergization or no delay. The normal lamp output to the output terminal LP is through a gate 124 and transistor 127 combination, similar to the combination on the up or down signal to operate the motor. Normally, the lamp is turned off by logic zero condition on conductor 93. The depletion-mode transistor 160 acts as load or pull up resistor to attempt to keep conductor 93 at the $-V$ voltage or logic one. However, from the above truth table in the stop down condition the two Q outputs of flip-flops 155 and 156 are at logic one. This is the condition when the system is at rest for a long time with the door closed. This turns on transistors 157 and 159, pulling conductor 93 to a logic zero. Thus, the NOR gate 124 has two zero inputs for a logic one output and a logic zero output of inverter 125. This turns off transistor 126. It this transistor is off, the lamp 24 is off, because then the lamp output terminal LP is at negative voltage $-V$ and this is applied, on FIG. 2, to the base of transistor 72. This $-V$ voltage is the same as external ground, which is the same as the emitter voltage. Hence, transistor 72 is turned off and so relay 62 is not energized and the lamp 24 is not energized.

Now if the conductor 93 goes to a logic one condition, this will turn on the lamp 24. Conductor 93 goes to a logic one, according to transistors 157, 158, and 159, if:

1. Output circuit 83 is in the run mode, which makes flip-flop 155 Q output go to zero, turning off transistor 159, or
2. Output circuit 83 is in the stop mode and the lamp option input terminal OPT is not connected to $-V$.

If the circuit is in the stop up mode, then the lamp is on because Q of flip-flop 155 is a one, but the Q of flip-flop 156 is a zero which turns off transistor 157, making conductor 93 a logic one. This one on the input of NOR gate 124 makes its output a logic zero; the output of inverter 125 is a logic one and this turns on transistor 126. As seen above, this turns on the lamp 24. The lamp is also on for the stop down mode, but in this mode the time delay of about 136 seconds is in operation. For the stop down mode, the above truth table shows that the Q of flip-flops 155 and 156 are a one which turn on both transistors 156 and 159. This makes conductor 93 a zero, and thus the reset on the flip-flops 113 to 116 is released. This permits these flip-flops to start to count the period of about 136 seconds. At the end of this time period, the flip-flop 115 toggles flip-flop 116 to make Q output a one and the $\overline{Q}$ output goes to a logic zero. With two zeroes on the input of NOR gate 124, the output goes to a one and the output of inverter 125 goes to a zero, which turns off the transistor 126 to turn off the lamp 24.

This above description assumes that the lamp option input OPT is not connected to $-V$. The The $-V$ is the same as external ground, and FIGS. 1 and 2 show this OPT terminal externally grounded, but this is optional. If it is connected to $-V$, this acts through gates 201–203 and turns on transistor 158 so that transistor 157 is ineffective and 157 is controlled by the down mode condition from flip-flop 156. Also, the lamp delay disable terminal DIS must be connected to the $-V$ in order to have the lamp deenergization delay. This $-V$ at terminal DIS passes through the inverter 117 to be a logic zero on the set terminal S of flip-flop 116 and thus has no effect. If the terminal DIS is not connected to $-V$, then the input to inverter 117 is connected to internal ground through transistor 118 so that the output of inverter 116 is a logic one and this hard sets the flip-flop 116 so that the delay is always zero.

The lamp invert option terminal LIO acts through the gates 201–203 on the transistor 158. When this LIO terminal is grounded at the sequencing control circuit 20, it inverts the action of the lamp, and this keeps the lamp on when the door 13 is in stop up.

The regulator transistor 127 operates from the output of gate 124 so that this transistor is turned on whenever transistor 126 is turned off, and this eliminates the need for external voltage regulation because the silicon chip on which the sequencer 64 is mounted will then have substantially constant current regardless of whether the lamp is on or off.

The preferred embodiment of the invention illustrates a sequencing control circuit 20 which controls a power circuit, including relays 60 and 61, which is connected to establish energization of the motor. A first control means, which includes the gates 226, 137, and 136, controls the motor starting in an opening direction, and a second control means, which includes the gates 220, 224, 225, and 222, is connected to control the motor starting in a closing direction. This second control means requires a second different type or pattern of contact closure of the manual switch means from the first type or pattern of contact closure which controls the opening direction of the door. The sequencing control circuit 20 may also include a second switch, such as the torque switch or limit switch, which is connected to deactivate the second control means upon the door reaching a closed limit position. Also, delay means, including the flip-flops 143 and 144, are connected to delay the deenergization of the motor upon actuation of this second switch.

In the preferred embodiment it will be noted that the first type or pattern of actuation conditions of the switch 44 or 45 is that which establishes the movement of the door or load in a first direction and a second type or pattern of actuation conditions of the switch establishes movement of the load in a second direction. The second type or pattern of actuation conditions includes actuation of this manual switch 44 or 45 at least one actuation in addition to that of the first type of actuation conditions. Also, the sequencing control circuits includes gate means 221 and 224 to store the information of the first type of switch actuation, and then the second control means is responsive to this stored information. Still further, the above description shows that the second control means effectively adds, in the NOR gate 225, the stored information in the gates 221 and 224 to the at least one additional actuation from gate 226 to obtain the second type of actuation conditions. In the preferred embodiment, the sequencing control circuit includes a first contact means 66 to be closed for the opening movement of the door and a second contact means 67 to be closed for the closing movement of the door. The flip-flops 155 and 156 are those which may be considered part of the control means to control the closing of the first and second contact means. The various gates, including gates 220, 224, 225, and 222, may be considered logic means connected to be responsive only to a plurality of closings of the switch means 44 or 45 to activate the operator for the closing movement. This logic means may be considered to be responsive to the flip-flop 155 Q being a one and the flip-flop 156 Q being a zero in order to enable the second control means, namely the means to effect closing movement of the door. It also may be considered that the logic means includes a timing means, including flip-flops 108, 109, and 110 and gate 223, which require a plurality of switch closings within a predetermined time period in order to activate the second control means.

The regulator transistor 166 operates in a manner similar to regulator transistor 127, and is turned on whenever the transistors 163 and 165 are off. This maintains substantially constant current on the chip to eliminate need for external voltage regulation.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A control circuit for a door operator motor operable from a voltage source to open and close a door as controlled by signals from manual switch means, said control circuit comprising in combination, a power circuit connected between said voltage source and said motor to establish energization of said motor, first control means connecting said manual switch means to said power circuit to control said motor starting in an opening direction of the door, means in said first control means establishing a first type of contact closure pattern of said manual switch means to actuate said first control means, second control means connecting said manual switch means to said power circuit to control said motor starting in a closing direction of the door, and means in said second control means establishing a second different type of contact closure pattern of said manual switch means to actuate said second control means.

2. A control circuit as set forth in claim 1, including a clock circuit connected to supply clock pulses to said first and second control means, and a synchronous debounce circuit connected to said manual switch means and synchronized with said clock circuit to minimize false actuation of the motor upon any bounce of the contacts of said manual switch means.

3. A control circuit as set forth in claim 1, including a second switch connected to deenergize said second control means upon the door reaching a closed limit position, and delay means connected to said second switch and connected to delay the deenergization of the motor upon actuation of said second switch.

4. A control circuit, comprising, in combination, an electric motor connectable to drive a load in first and second opposite directions toward first and second limit positions, respectively, electrical terminals connectable to an electrical power source, a power circuit connected to said motor and to said terminals for energization of said motor to drive said load in said first and second directions, a manual switch, first control means operable with the load at rest in said second position and interconnecting said switch and said power circuit and responsive to a first pattern of actuation of said switch to establish said motor operational to move the load in said first direction, and second control means operable with the load at rest in said first position and interconnecting said switch and said power circuit and responsive to a second pattern of actuation of said switch to establish said motor operational to move the load in said second direction.

5. A control circuit as set forth in claim 4, wherein said second pattern of actuation includes at least one actuation of said switch in addition to that of said first pattern.

6. A control circuit as set forth in claim 5, including means to store the information of said first pattern of switch actuation, and said second control means being responsive to said stored information.

7. A control circuit as set forth in claim 6, wherein said second control means adds the stored information to the at least one additional actuation to obtain said second pattern of actuation.

8. A control system for a garage door operator motor connectable to open and close a garage door, comprising in combination, first contact means for energizing the motor from a voltage source for opening movement of the door, second contact means for energizing the motor from the voltage source for closing movement of the door, first control means to control the closing of said first contact means to effect opening movement of the door, second control means connected to control the closing of said second contact means to effect closing movement of the door, manual switch means connected to control said first and second control means, and logic means connected between said switch means and said second control means and responsive only to a plurality of closings of said switch means to activate the door operator for the closing movement.

9. A control system as set forth in claim 8, wherein said logic means includes means responsive to the present condition of the control system to enable said second control means.

10. A control system as set forth in claim 8, wherein said logic means includes means responsive to the condition of only door open and stationary of the control system to enable said second control means.

11. A control system as set forth in claim 8, wherein said logic means includes timing means requiring said plurality of switch closings within a predetermined time period in order to activate said second control means.

12. A control system as set forth in claim 8, wherein said logic means includes timing means requiring at least first and second switch closings within first and second predetermined time periods, respectively, in order to activate said second control means.

13. A control system for connection to a closure of a building, comprising, in combination, output relay means, contact means on said output relay means and connectable to a voltage source, control means connected to control the actuation of said output relay means and corresponding to a given directional movement of the closure, switch means connected to actuate said control means, means for connecting one of said contact means and said switch means to the closure, and logic means connected between said switch means and said control means and responsive only to a plurality of closings of said switch means to activate said output relay means and the closing of said contact means.

14. A control system as set forth in claim 13, wherein said output relay means is connected to the control direction of movement of the closure, and said switch means is a manual switch connected to control said control means.

15. In a garage door operator having a motor and a drive train connectable to actuate a garage door between open and closed conditions, condition means establishing control of the motor and drive train for four conditions of opening movement, door open and stationary, closing movement, and door closed and stationary, control means connected to said condition means to control the initiation of at least said opening and closing movement conditions, and switch means connected to said control means, the improvement wherein said control means includes means requiring a plurality of actuations of said switch means to initiate said door closing movement condition.

16. A door operator as set forth in claim 15, wherein said requiring means includes means to initiate said door closing movement condition only in said door open and stationary condition.

17. A door operator as set forth in claim 15, wherein said control means includes means to establish said door opening and closing movement conditions effective upon different actuation patterns of said switch means.

18. A door operator as set forth in claim 15, wherein said requiring means includes means to respond to a plurality of actuations of said switch means only during a predetermined time period to initiate said door closing movement condition.

19. A door operator as set forth in claim 15, wherein said requiring means includes means to respond to a second actuation of said switch means only during a predetermined time period to initiate said door closing movement condition.

* * * * *

UNITED STATES PATENT AND TRADEMARK OFFICE

CERTIFICATE OF CORRECTION

PATENT NO. : 4,357,564

DATED : November 2, 1982

INVENTOR(S) : Andrew F. Deming and Ronald C. Todd

It is certified that error appears in the above—identified patent and that said Letters Patent is hereby corrected as shown below:

Page 1, column 1, under Assignee, "The Alliance Manufacturing Company" should be --The Alliance Manufacturing Company, Inc.--

Column 6, line 36, "Q" should be --$\bar{Q}$--

Column 6, line 38, "$\bar{Q}$" should be --Q--

Column 7, line 54, "$\bar{T}$" should be --T--

Column 7, line 56, "T" should be --$\bar{T}$--

Column 10, line 15, "no" should be --not--

Column 11, line 11, "filp-flops" should be --flip-flops--

Column 12, line 48, "$\bar{Q}$" should be --Q--

Column 12, line 49, "Q" should be --$\bar{Q}$--

Column 14, line 53, delete "from" (second occurrence)

Column 15, line 22, "73" should be --173--

Column 16, line 55, delete "The" (second occurrence)

Signed and Sealed this

*First* Day of *February 1983*

[SEAL]

*Attest:*

GERALD J. MOSSINGHOFF

*Attesting Officer* *Commissioner of Patents and Trademarks*